US011816742B2

(12) United States Patent
Kamat et al.

(10) Patent No.: US 11,816,742 B2
(45) Date of Patent: Nov. 14, 2023

(54) INTELLIGENT DATA GATHERING

(71) Applicant: HRB Innovations, Inc., Las Vegas, NV (US)

(72) Inventors: Vinayak Kamat, Overland Park, KS (US); Jason Houseworth, Olathe, KS (US); Todd Alexander Michael, Greensboro, NC (US)

(73) Assignee: HRB Innovations, Inc., Wilmington, DE (US)

( * ) Notice: Subject to any disclaimer, the term of this patent is extended or adjusted under 35 U.S.C. 154(b) by 734 days.

(21) Appl. No.: 15/581,441

(22) Filed: Apr. 28, 2017

(65) Prior Publication Data

US 2018/0315130 A1 Nov. 1, 2018

(51) Int. Cl.
 *G06Q 40/12* (2023.01)
 *G06Q 40/02* (2023.01)
(52) U.S. Cl.
 CPC .......... *G06Q 40/123* (2013.12); *G06Q 40/02* (2013.01)
(58) Field of Classification Search
 CPC ........ G06Q 20/40; G06Q 40/02; G06Q 30/04; G06Q 40/123
 USPC ...................................................... 705/44, 31
 See application file for complete search history.

(56) References Cited

U.S. PATENT DOCUMENTS

| 9,047,857 B1* | 6/2015 | Barton | G10L 25/48 |
| 10,795,966 B1* | 10/2020 | Farner | H04L 67/06 |
| 2009/0112757 A1* | 4/2009 | Hammad | G06Q 40/00 705/39 |
| 2012/0022983 A1* | 1/2012 | Hughes, Jr. | G06Q 40/02 705/31 |
| 2012/0084185 A1* | 4/2012 | Ciaramitaro | G06Q 40/123 705/31 |
| 2014/0180883 A1* | 6/2014 | Regan | G06Q 40/123 705/31 |
| 2017/0316513 A1* | 11/2017 | Hubbard | G06Q 40/123 |

OTHER PUBLICATIONS

Stolojescu-Crisan, C., Crisan, C. and Butunoi, B.P., 2021. An IoT-based smart home automation system. Sensors, 21(11), p. 3784. (Year: 2021).*
Podgorny, I., Khaburzaniya, Y. and Geisler, J., May 2019. Conversational agents and community question answering. In CHI 2019 Workshops, Glasgow, United Kingdom. (Year: 2019).*

(Continued)

*Primary Examiner* — Mike Anderson
*Assistant Examiner* — John O Preston
(74) *Attorney, Agent, or Firm* — Erise IP, P.A.

(57) ABSTRACT

An electronic tax assistant for assisting a user in preparing for a tax return preparation process, wherein the electronic tax assistant performs the following steps: determine a trigger based upon a data input, wherein the trigger is indicative of a potential tax implication; determine a data request based at least in part on the data input, wherein at least one of the data input and the data request is associated with an external device; receive a response based upon the data request, wherein the response is indicative as to whether the trigger is indicative of an actual tax implication; and provide, upon determining the actual tax implication, information in indicative of the data input and the response to an external repository associated with a tax preparation system.

20 Claims, 3 Drawing Sheets

(56) References Cited

OTHER PUBLICATIONS

Mellado-Silva, R., Faúndez-Ugalde, A. and Lobos, M.B., Nov. 2020. Learning tax regulations through rules-based chatbots using decision trees: a case study at the time of COVID-19. In 2020 39th International conference of the chilean computer science society (SCCC) (pp. 1-8). IEEE. (Year: 2020).*

* cited by examiner

INTELLIGENT DATA GATHERING

BACKGROUND

1. Field

Embodiments of the invention relate to the gathering of data to be used by another process or system.

2. Related Art

Various systems and processes require information to be gathered prior to beginning the process. For example, in the tax preparation process the client must gather various documents and records to aid in the completion of a tax return. As another example, in the certain legal processes the client must gather various documents (such as for a divorce or bankruptcy) to aid in the legal process. As yet another example, in the real estate process the client must gather various documents before listing their property.

In these and other processes, there is a certain burden placed on the client to know or learn information about the process and the required supporting information and documentation. Clients typically will then begin the process without the proper information and documentation necessary. This leads to wasted time on behalf of the client (who must remedy the situation) and the professional or other persona assisting with the process (who must explain the necessary information and documentation). There does not exist in the prior art a preparation assistant for aiding the client in understanding and gathering the necessary documents and information.

SUMMARY

A first embodiment of the invention is directed to a home assistance device configured to interact with a user, the home assistance device comprising a speaker, a microphone, a communications element, and a processor. The speaker is configured for producing an audible message. The microphone is configured for receiving an audible input. The communications element is communicably coupled to an external device and an external repository. The processor programmed to: determine a trigger based upon a data input; determine a data request based at least in part on the data input, wherein at least one of the data input and the data request is associated with the external device; receive a response based upon the data request; and provide, to the external repository, information indicative of the data input and the response.

A second embodiment of the invention is directed to one or more non-transitory computer readable storage media storing computer-executable instructions that perform functions of a tax assistant for a user, wherein execution of the computer-executable instructions by at least one processing element performs the following steps: determine a trigger based upon a data input, wherein the trigger is indicative of a potential tax implication; determine a data request based at least in part on the data input, wherein at least one of the data input and the data request is associated with an external device; receive a response based upon the data request, wherein the response is indicative as to whether the trigger is indicative of an actual tax implication; and provide, upon determining the actual tax implication, information in indicative of the data input and the response to an external repository associated with a tax preparation system.

A third embodiment of the invention is directed to an electronic tax assistant for assisting a user in preparing for a tax return preparation process, wherein the electronic tax assistant performs the following steps: determine a trigger based upon a data input, wherein the trigger is indicative of a potential tax implication; determine a data request based at least in part on the data input, wherein at least one of the data input and the data request is associated with an external device; receive a response based upon the data request, wherein the response is indicative as to whether the trigger is indicative of an actual tax implication; and provide, upon determining the actual tax implication, information indicative of the data input and the response to an external repository associated with a tax preparation system.

Still other embodiments of the invention may be directed to a computerized method of implementing the above-discussed steps. Still other embodiments of the invention may be directed to a system that comprises a server and a user device, wherein the user device is selected from the group consisting of a smart phone and a home assistance device. The server is configured to interface with at least one external device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit embodiments of the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a method, and a system for responding to triggers related to the production of documents. A trigger may include a question posed by a user, a new event or status that is detected, a document or other set of data that is received, or other event that may have an impact on the user. The trigger may therefore be used to gather information soon in time to the trigger such that the user is most familiar with the trigger and the needed information may be easily gathered or verified.

Figure 1:
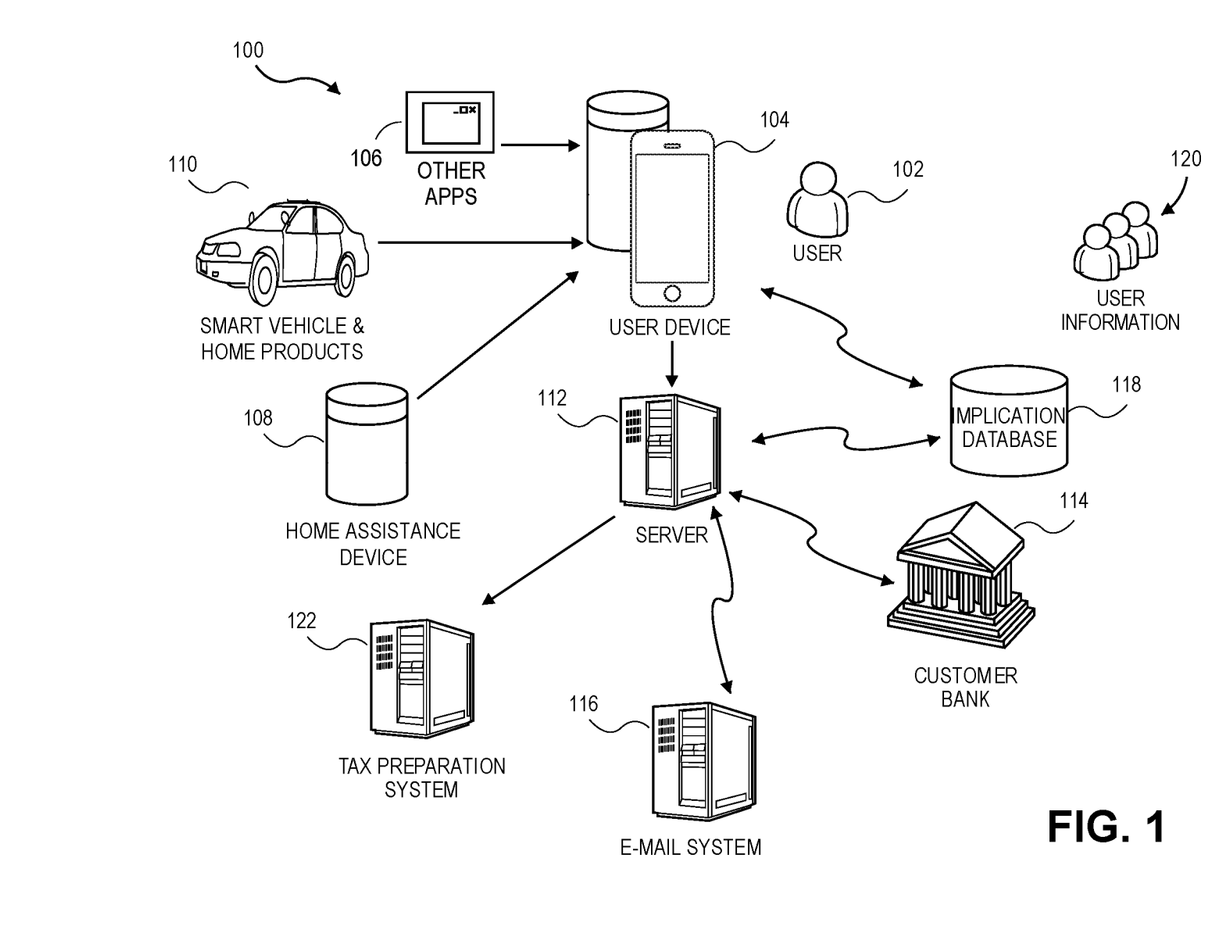
FIG. 1 is an exemplary hardware diagram illustrating various hardware components that may be components of or associated with embodiments of the invention.
Figure 2:
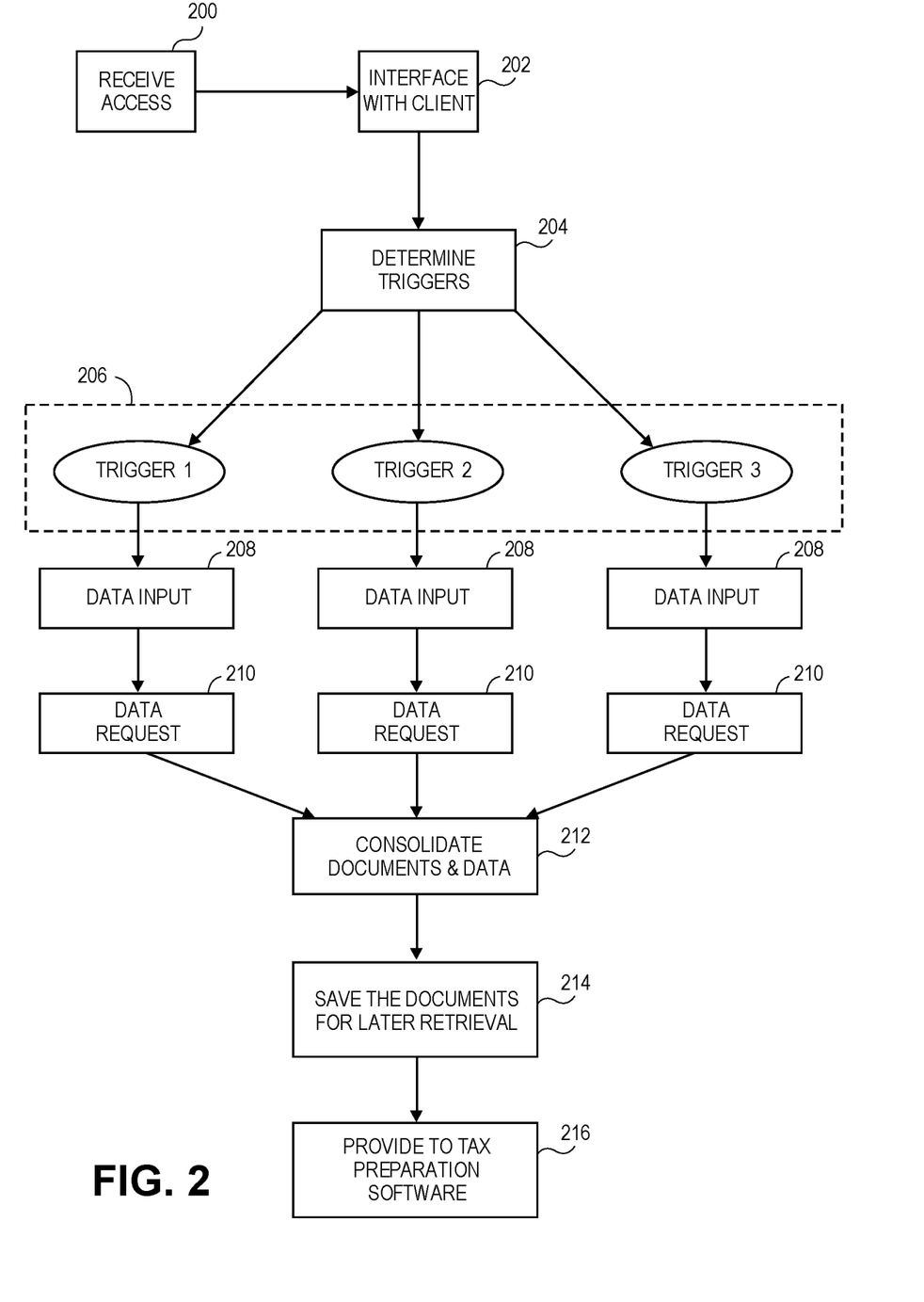
FIG. 2 is a flow diagram illustrating exemplary steps performed by embodiments of the invention.

Turning to FIG. 1, a system diagram illustrating various hardware components that may be present in or associated with various embodiments of the invention is presented. Generally, as shown in FIG. 2, the system will obtain access to one or more data sources. Based upon these data sources, the system will interface with the client to determine certain triggers. Based upon these triggers, the system will receive a data input (which may be associated with the trigger) and request data or documents. The system will then consolidate all documents and other data that has been gathered. These documents and other data will be saved for later retrieval, such as by an external system or process.

It should be appreciated that while the below description is directed primarily to the field of tax preparation, this is only an exemplary field of use for the invention. Tax preparation is used throughout for consistency and to ease the understanding by the reader. It should be apparent that other fields of use may be utilized by various embodiments of the invention, and the invention should not be viewed as being limited to tax preparation.

In the exemplary tax preparation field, the system may utilize or be described as a tax assistant (or in other fields, more generically an "assistant"). A tax assistant helps the user with preparing for a tax preparation process. The tax assistant may provide assistance to the user over time, such as throughout the year or beginning at the tax return season when the user begins receiving tax-related documents. The tax assistant therefore provides a service that is distinct from tax preparation, in which the documents and other information are presumed to be provided by the user. The tax assistant aids the user in preparing for the tax preparation process. The tax assistant may then transfer or make available various documents and information that have been gathered, which may include providing these documents and other data to a tax preparation system or program.

Some embodiments of the invention create a virtual tax assistant (or an electronic tax assistant), which may be integrated with a voice recognition program. This tax assistant is configured to help the user understand what data they need for their tax situation, then ask the user to put in their credentials for their financial accounts. Once the user has granted access, the tax assistant could act on behalf of the user to go collect tax documents automatically. Then, when the user has any questions about their tax situation, the tax assistant could reply based on the past tax history and/or based on the information they had collected for the year.

This tax assistant may also act as an intermediary between a tax professional and the user. The tax professional may therefore provide the user with a tax assistant to help in the document gathering and preparation process. This tax assistant could gather the documents and then allow the user to choose to complete a tax return on their own, ask for a tax expert to review the tax return, or share this data with a personal tax professional in an office and setup an appointment. A voice component of the tax assistant may also act as a companion to a tax preparation program. In this way, the tax assistant may continue to answer tax questions, provide reference to frequently asked questions (FAQs), provide tax tips, and general tax advice tailored to client's tax situation.

Returning to FIG. 1, a system 100 of components associated with the tax assistant is illustrated. The tax assistant interacts with a user 102 via a user device 104. The user device 104 may be a smart phone, a home assistance device (as discussed below) or other computing device. The user device 104 receives input from other devices and programs. In some embodiments, the tax assistant may receive access to other applications 106 (apps) that are on the user device 104. These other apps may include e-mail clients, cameras, photograph storage, document storage, and other apps. In some embodiments of the invention, the tax assistant may operate at least in part on a home assistance device 108, such as an AMAZON ECHO, a GOOGLE HOME, or other similar device. The home assistance device may include a speaker for producing audible messages and a microphone for receiving audible input. The home assistance device may further comprise a processor, a memory, a communications element, and other hardware components such as those described below. As another example, some embodiments of the invention may operate at least in part on or be associated with a voice recognition program such as AMAZON ALEXA, GOOGLE ASSISTANT, APPLE SIRI, or MICROSOFT CORTANA which may be associated with a smart phone, a home assistance device 108, or other computing device of the user 102. As another example, some embodiments may be external to these systems such that they can share information and/or use the voice recognition program as a conduit to perform the other described functions. It should be appreciated that in some embodiments, the tax assistant is associated with a smart phone and is communicably coupled with the home assistance device 108, and that in other embodiments the tax assistant is associated with the home assistance device 108 and is communicably coupled with a smart phone or other computing device.

In some embodiments, the tax assistant may receive access to smart vehicle and home products 110, and other computing devices. For example, the tax assistant may acquire access to a smart home thermostat, such as a NEST LEARNING THERMOSTAT or other similar device, such that the tax assistant can monitor information related to climate control of a home or office. As another example, the tax assistant may acquire access to a computing systems associated with a vehicle, such as a TESLA vehicle, such that the tax assistant can monitor miles traveled, energy use for powering the vehicle, and other metrics that may have potential tax implications. In some embodiments, the tax assistant gains access to an application ("app") associated with these devices instead of acquiring access to the device itself. This may allow the tax assistant to gain access to the associated data from the devices in an easy-to-access manner.

In some embodiments of the invention, the tax assistant may acquire access to various accounts of the user 102 to monitor for information of potential tax importance. In some instances, the acquiring of access to these accounts is performed via the other apps 106 on the user device 104 (or other computing device). In other embodiments, the acquiring of access is performed via a server 112. For example, the server 112 or the user device 104 may interface with a customer bank 114 such that the tax assistant may acquire access to a bank account associated with the user 102. The access may allow the tax assistant to monitor for purchases, incomes, and expenses that may have tax implications.

As another example, the server 112 or the user device 104 may interface with an e-mail system 116 such that the tax assistant may acquire access to an e-mail account of the user 102. The e-mail account may include information relative to receipts, travel, business meals, donations, and other information of potential tax impact. As yet another example, the tax assistant may acquire access to a social media account (not illustrated) associated with the user 102, so as to monitor or search for potentially tax-related information that is shared or discussed.

In some embodiments, the tax assistant receives access to several different platforms, computing devices, and systems (such as those discussed above or others). In this way, the tax assistant may acquire triggers of many different types. This allows the tax assistant to acquire information from several different sources and assist the user 102 across several different types of fields. This gives the tax assistant a broader net to capture information that may have potential tax implications.

The server 112 and/or the user device 104 may also interface with an implication database 118 that includes a set of user information 120; information related to tax laws, rules, and regulations; frequently asked questions and corresponding answers; general tax advice, and other information. The server 112 and/or the user device 104 may additionally provide or make information available to a tax preparation system 122 such that the information acquired through the below-discussed steps can be utilized in a tax preparation process.

Turning to FIG. 2, the steps performed by the tax assistant and other components of the system 100 will be discussed in more detail. Various steps may be performed using exemplary hardware such as shown in FIG. 1 and discussed above. Various steps may additionally or alternatively be performed across other hardware or may be split between hardware.

In Step 200, the tax assistant receives access to various systems, processes, and/or repositories. The tax assistant may receive this access by requesting credentials from the user 102 for the various systems, processes, and/or repositories. The access may, in some embodiments, be ongoing such that the tax assistant may periodically or continuously monitor for new triggers (as discussed below). The tax assistant may therefore operate as a background program on one or more computing devices. These one or more computing devices may be linked or otherwise associated. The various systems, processes, and/or repositories may include at least a portion of those components illustrated in FIG. 1 and discussed above. It should also be appreciated that other systems, processes, and repositories may be utilized and be within the scope of the invention. The specifically discussed components are only presented as examples.

In Step 202, the tax assistant interfaces with the client and/or the repository of information. In some embodiments, the tax assistant may operate as a background function on a certain computing device, such as a smart phone of the user 102. The tax assistant may monitor other apps, e-mails, and the like to determine if some information may be potentially relevant to taxes. In some, the tax assistant may operate as a front-facing function that directly interacts with the client. The front-facing function may respond to user 102 inquiries or present inquiries to the user 102, present inquiries to the user 102 regarding information discovered from another source, present information to the user 102 regarding the tax preparation process (which may include information related to the needed documents, the needed information, what to expect from the process, and other information to help the user 102 be prepared for the tax preparation process).

In Step 204, the tax assistant determines triggers that may require additional inquiry or require the storing of information. A "trigger" is an event, action, or circumstance that prompts the tax assistant to take a further action. In embodiments of the invention, the trigger may be a client-initiated trigger or an assistant-initiated trigger. In embodiments of the invention, the tax assistant is configured to interact with both client-initiated triggers and assistant-initiated triggers. The tax assistant may initiate some triggers based upon information gathered from the other systems and devices, and may also respond to user 102 inquiries related to taxes and tax implications.

A client-initiated trigger may be performed by the client asking a question verbally or making a statement to the tax assistant (such as via a voice recognition program). For example, the user 102 may say "Alexa, I just bought printer ink at an office supply store. Is that tax deductible?" As another example, the user 102 may say "Siri, that trip that I just came back from was a business trip." A client-initiated trigger may also be performed by the client interacting with an app associated with the tax assistant. For example, the client may import a picture of a receipt into an app associated with the tax assistant. The client may additionally select an option on the app to run a scan of the user's e-mail account at the e-mail system 116.

An assistant-initiated trigger may be performed by the tax assistant performing a scan or receiving an indication of an event from an external system. The scan may be performed periodically. For example, the tax assistant may interface with a smart thermostat once per month to receive energy usage information for that month. Similarly, the tax assistant may scan the user's e-mail account at some interval (such as once per minute, once per hour, once per day, once per week, or other interval. As another example, the tax assistant may check for monthly bank statements issued in association with the user's account from the customer bank 114 on the day when the statement becomes electronically available.

In Step 206, the tax assistant responds to or performs functions associated with each trigger. As depicted in FIG. 1, Step 206 is shown as a single step with multiple triggers (labeled Trigger 1, Trigger 2, and Trigger 3, respectively) therein. In some instances, multiple triggers may be discovered or received simultaneously. In some instances, multiple triggers may be retained in a queue until such time that the user 102 is interacting with the system 100 such that the triggers can be handled. In some instances, a single event may be treated as multiple triggers, as there may be more than one tax implication for a certain event.

In Step 208, the tax assistant analyzes a data input associated with the trigger. Based upon the data input, the tax assistant may perform calculations related to the tax implications, may determine what (if any) information should be stored in association with the trigger, and what (if any) further information or documentation is needed to be able to complete the analysis of the trigger.

For example, if the trigger is related to a travel itinerary discovered by the tax assistant in an e-mail account of the user 102, the analysis of the data input may be as follows. The tax assistant may consider the destination, the airline, the duration of the trip, and other factors to determine how likely the trip is to be a business expense. Based upon this analysis, the system 100 may determine that it needs additional information. The additional information that may be needed may be to find another mention of the trip and determine whether the trip is listed on a personal or work calendar for the user 102. The additional information may also be looking into what credit card or bank account paid for the trip. The additional information may also look into previous trips taken by the user 102 and whether those trips were categorized as business related. The additional information may also include a request for verification presented to the user 102.

In Step 210, the tax assistant generates a data request. The data request attempts to locate or receive the additional information described above. In fulfilling the data request, the tax assistant may access an external device or system, request information from an external device or system, access an external application on the current device or system, request information from an external application on the current device or system, request information from the user 102, or some combination thereof.

In some embodiments, the data request may return with or otherwise acquire a document, a set of documentation, an electronic record, a receipt, supporting data, or other proof to support the tax implication (generally, a "document"). The document may be retained for various purposes. First, the document may be retained to be used in preparation of a tax return, in tax planning, or other related purposes. Second, the document may be retained such that it may be used as supporting documentation in the event of an audit or other legal proceeding. Third, the document may be retained for general record keeping purposes for the user 102.

It should be appreciated that in some instances, no additional information will be necessary to complete the analysis of the trigger. In some instances, the trigger may result in no tax implications. As such, following the analysis and determination of no tax implications (or a finding that the probability of tax implications were below a certain low threshold), the inquiry may end. The system 100 may then analyze other pending triggers or perform other functions. In some instances, the trigger may include all information needed. For example, the trigger may be the receipt of a periodic report from a business-related account. The tax assistant may know that all expenses from this account are business-related expenses. As such, the system 100 may store this document without requesting any additional data.

In Step 212, the tax assistant consolidates documents and data that were gathered as part of the data input, the data request, a user response to the data request, or some combination thereof. These documents and data may consolidated documents from a single trigger, from multiple concurrent triggers, from all (or substantially all) triggers over time, or the like. It should be appreciated that in many instances, the document is an electronic document. The electronic document may include an electronic file, a document image (such as a Portable Document Format, PDF), a photograph or scanned image of a document, or other electronic representation of information.

In Step 214, the tax assistant saves the consolidated documents and data for later retrieval. The data may be saved locally on the user device 104, locally on the home assistant device, remotely in a user account associated with the tax assistant, remotely in a user account associated with a tax preparation program, by sending an electronic message to the user 102 (such as via e-mail).

The document and other data may be saved with metadata associated therewith. Metadata associates one set of data with another set of data. The metadata may be embedded in the document, stored externally in a separate file that is associated with the document, otherwise associated with the document, or some combination of the above. Embedding the metadata into the same file with the document data can be advantageous because it allows the metadata to travel as part of the data it describes. In some such embodiments, metadata is associated with a particular page, field, text string, or other data. This is advantageous where, for example, the same document includes more than one tax implication. In other such embodiments, the metadata is associated with the document as a whole. Externally stored metadata may also have advantages, such as ease of searching and indexing. The metadata may also be stored in a human-readable format, such that a user 102 can access, understand, and edit the metadata without any special software.

In some instances, the document itself is stored. In some instances, summary information indicative of the document is stored, which may include information as to a location of the original document. This may be useful in that the summary information indicative of the document may be of a much smaller size than the document itself. For many purposes, this summary information (such as a total amount of money, a purpose for the money, and a tax category) may be all that is needed for the tax preparation process. The original document itself may only be necessary in the event of an audit or other legal proceeding. In some instances, the user 102 may be presented an option to select whether to save the entire document or the summary information.

The system 100 may also categorize the document or data according to an area of the tax field that is implicated by the tax document. For example, some documents may support charitable donations while other documents may support business expenses. The charitable donation documents may therefore be consolidated separately from the business expense documents. The tax assistant may also provide totals and other analysis for each category. For example, the user 102 may ask "Alexa, how much have I donated to charity so far this year?" The tax assistant may therefore provide an analysis of all charitable donation documents. This may help the user 102 achieve a charitable giving goal or avoid excessive charitable giving.

In Step 216, the tax assistant provides at least a portion of the consolidated documents, or summary information indicative thereof, to a tax preparation system 122 and/or tax professional. The documents and/or summary information may then be used by the tax preparation system 122 or tax professional to prepare a tax return, perform tax planning, manage notice documents, respond to audits, and perform other tax-related functions. In some embodiments, at least a portion of the consolidated documents and/or summary information may be provided to a financial professional.

The consolidated documents and/or summary information is provided so that a tax return may be prepared on behalf of a subject taxpayer. The subject taxpayer may include any entity, either a legal or natural person, that files a tax return with a government taxing authority. The subject taxpayer may also be a married couple or other plurality of individuals filing a single tax return. The subject taxpayer may be the user 102 or may be a member of the user's household.

Taxes to be paid can be United States Federal Income Tax, income tax for the various states within the United States, corporate taxes, partnership taxes, LLC taxes, property taxes, tariffs, or other taxes. Typically, the subject taxpayer provides information relevant to themselves and the amount of tax owed in the form of the tax return (based upon incomes, expenses, and the like). The tax return may therefore include information indicative of the employer and/or a field of employment to which the subject taxpayer is or may be associated.

The tax return is essentially a report filed with the appropriate government taxing authority, such as the Internal Revenue Service in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the subject taxpayer or tax preparer calculates the taxes due. To assist in the calculation and to allow the taxing authority to verify the calculations, the tax return contains pertinent information associated with the subject taxpayer for the tax year. The tax return can be either written, digital, or a combination of both. In other embodiments, information relevant to the subject taxpayer and the tax to be paid are provided on other various forms and documents, such as a Form W2 or a Form 1099.

In embodiments of the invention, the invention is utilized by a tax professional. The tax professional may provide the tax assistant to the user 102 via the user device 104. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing at least a portion of the set of taxpayer information 120, the implication database 118, a retailer profile (which may include item offerings and descriptions), and other relevant information.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help bolster the legitimacy of the clients' tax returns.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a commercial retailer or non-profit organization. The commercial retailer may provide embodiments of the invention as an incentive to users to use their retail services over competitors. By assisting the user 102 in identifying tax implications (or other implications), the commercial retailer is providing a desired service to their customers. The commercial retailer may also implement embodiments of the invention that are directed to suggesting purchases based upon the tax implications. For example, the retailer may recommend a certain product or service based upon the known characteristics of the user 102 and the likelihood that such product or service may be tax deductible.

In some embodiments, various steps described herein can be accomplished by using unique parameters in a recurrent neural network seeded with the implication database 118. Parameters from the database 118 may include user information 120 (such as an income level, occupation, family characteristics, demographics, and other potentially relevant information) from a user account and/or prior tax returns, tax laws and regulations, among other information. The network will be trained by the user 102, and other similar users, as tax implications are either verified or denied by the user 102.

In some embodiments of the invention, a machine learning model will consult a database of tax implications and related documents to determine the probability of whether a particular document or trigger has a tax implication. Tax implications can initially be procured by the tax professional or by the system 100. In some embodiments, all or some of the user-verified data and/or tax-professional-verified data are saved to the database. Thus, the database becomes more valuable and accurate as usage increases. Over time, the model may become personalized for each user 102 based on user behavior. This allows for a lower error rate over time.

In some embodiments, the system 100 may present supplemental information to the user 102 along with the request for verification that helps the user 102 make an informed verification decision. The supplemental information may include information related to the various tax implications, laws, regulations, standards, and the like.

It should be appreciated that in many instances the user 102 will not know whether the trigger has a tax implication without this supplemental information. The user 102 may also incorrectly assume the tax implication without knowing the detailed rules and regulations that govern business expenses. The system 100 may therefore select a portion of the regulation that is most relevant to the determination present or emphasize this information for the user 102. For example, certain business related meals may be tax deductible as long as business was discussed at the meal. The system 100 may therefore present a query to the user 102 regarding whether business was discussed at the meal.

Figure 3:
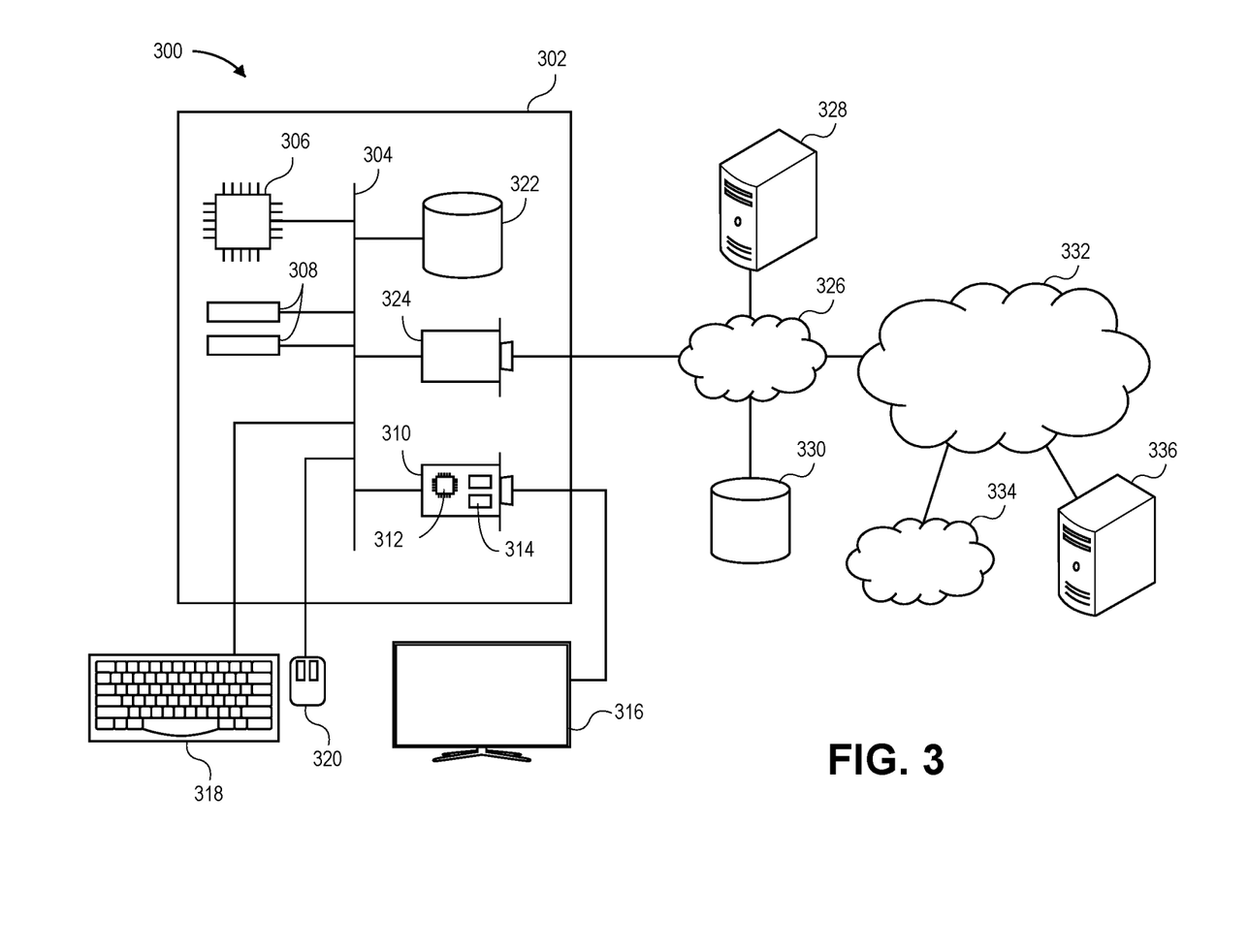
FIG. 3 is a system diagram of an embodiment of the invention depicting various computing devices and their components.

Turning to FIG. 3, an exemplary set of specific components of the system 300 will now be discussed. An exemplary hardware platform for certain embodiments of the invention is depicted. Computer 302 can be a desktop computer, a laptop computer, a server computer, a mobile device such as a smartphone or tablet, or any other form factor of general- or special-purpose computing device. Depicted with computer 302 are several components, for illustrative purposes. In some embodiments, certain components may be arranged differently or absent. Additional components may also be present. Included in computer 302 is system bus 304, whereby other components of computer 302 can communicate with each other. In certain embodiments, there may be multiple busses or components may communicate with each other directly. Connected to system bus 304 is central processing unit (CPU) 306. Also attached to system bus 304 are one or more random-access memory (RAM) modules 308. Also attached to system bus 304 is graphics card 310. In some embodiments, graphics card 310 may not be a physically separate card, but rather may be integrated into the motherboard or the CPU 306. In some embodiments, graphics card 310 has a separate graphics-processing unit (GPU) 312, which can be used for graphics processing or for general purpose computing (GPGPU). Also on graphics card 310 is GPU memory 314. Connected (directly or indirectly) to graphics card 310 is display 316 for user interaction. In some embodiments no display is present, while in others it is integrated into computer 302. Similarly, peripherals such as keyboard 318 and mouse 320 are connected to system bus 304. Like display 316, these peripherals may be integrated into computer 302 or absent. Also connected to system bus 304 is local storage 322, which may be any form of computer-readable media, and may be internally installed in computer 302 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 324 is also attached to system bus 304 and allows computer 302 to communicate over a network such as network 326. NIC 324 can be any form of network interface known in the art, such as Ethernet, ATM, fiber, Bluetooth, or Wi-Fi (i.e., the IEEE 802.11 family of standards). NIC 324 connects computer 302 to local network 326, which may also include one or more other computers, such as computer 328, and network storage, such as data store 330. Generally, a data store such as data store 330 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 328, accessible on a local network such as local network 326, or remotely accessible over Internet 332. Local network 326 is in turn connected to Internet 332, which connects many networks such as local network 326, remote network 334 or directly attached computers such as computer 336. In some embodiments, computer 302 can itself be directly connected to Internet 332.

The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-alone computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the user 102 may be provided with a taxpayer account that permits the taxpayer to access embodiments of the invention that are applicable to interact with the tax assistant and provide access to repositories. Additionally, a retailer may be provided with a retailer account that permits the retailer to access embodiments of the invention that are applicable to allowing access to their associated systems and processes. Additionally, the tax preparer may be provided with a tax preparer account, through which he can access the saved information, update the user account, and perform other tax-related functions. In addition, any number and/or any specific types of account are provided to carry out the functions, features, and/or implementations of the invention. Upon the taxpayer, retailer, and/or tax preparer logging in to the electronic resource for a first time, they may be required to provide various pieces of identification information to create their respective accounts. Such identification information may include, for instance, personal name, business name, email address, phone number, or the like. Upon providing the identification information, the subject taxpayer, retailer, and/or tax preparer may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A home assistance device configured to interact with a user, the home assistance device comprising:
   a speaker for producing an audible message;
   a microphone for receiving an audible input;
   a communications element communicably coupled to an external device and an external repository,
   wherein the external repository is associated with a tax preparation system; and
   a processor programmed to:
      request credentials from the user to access one or more user accounts of the user, the one or more user accounts comprising at least an email account;
      after receiving the credentials, automatically access the one or more user accounts using the credentials on behalf of the user to review a plurality of documents associated with the one or more user accounts including one or more receipts from the email account;
      apply a machine learning model to the plurality of documents to determine one or more relevant documents of the plurality of documents that are associated with a potential tax implication, the machine learning model being trained to identify potential tax implications using historic tax implication data from a tax implication database;
      retrieve the one or more relevant documents from the one or more user accounts;
      continuously monitor, as a background function of the home assistance device, a data set associated with at least one of the microphone, the external device, the external repository, and the one or more user accounts including the one or more relevant documents over an extended period of time to detect a data input;
      automatically determine an assistant-initiated trigger based upon the data input;
      interface with the tax implication database via the communications element;
      determine a probability that the assistant-initiated trigger is indicative of the potential tax implication by using the machine learning model to consult the tax implication database,
      wherein the tax implication database comprises user-verified data such that the machine learning model is personalized to the user;
      determine a data request based at least in part on the data input,
      wherein at least one of the data input and the data request is associated with the external device;
      receive a response based upon the data request,
      wherein the response is indicative as to whether the assistant-initiated trigger is indicative of an actual tax implication;
      provide the one or more relevant documents from the one or more user accounts to the tax preparation system for a tax return preparation process; and
      provide, upon determining the actual tax implication, information indicative of the data input and the response to the external repository and the tax implication database to improve an accuracy of the machine learning model.

2. The home assistance device of claim 1, wherein the data input is detected by analyzing, via the processor, the audible input via the microphone.

3. The home assistance device of claim 1, wherein the data input is detected by analyzing the one or more user accounts of the user.

4. The home assistance device of claim 1,
wherein the external device is a first external device,
wherein the communications element is communicably coupled to a second external device,
wherein the first external device is a smart phone associated with the user, and
wherein the second external device is a server configured to interface with at least one of a customer bank and an e-mail system.

5. The home assistance device of claim 1,
wherein said information indicative of the data input and the data request is configured to be used by the tax preparation system in preparation of a tax return.

6. The home assistance device of claim 5,
wherein the external repository is further associated with a bank, and
wherein the processor is further programmed to access a bank account associated with the user and the bank to monitor the bank account for at least one of purchases, income, and expenses.

7. The home assistance device of claim 5,
wherein the data input is received from the external device,
wherein the data request is presented to the user by the audible message via the speaker, and
wherein the response is received from the user by the audible input via the microphone.

8. The home assistance device of claim 5,
wherein the data input is received from the user by the audible input via the microphone,
wherein the data request is presented to the external device to verify the potential tax implication, and
wherein the response is presented to the user by the audible message via the speaker.

9. One or more non-transitory computer readable storage media storing computer-executable instructions that perform functions of a tax assistant for a user, wherein execution of the computer-executable instructions by at least one processing element performs:
request credentials from the user to access one or more user accounts of the user, the one or more user accounts comprising at least a financial account;
after receiving the credentials, automatically access the one or more user accounts using the credentials on behalf of the user to review a plurality of financial documents of the user from the financial account;
continuously monitor, as a background function of the at least one processing element, a data set associated with the one or more user accounts including the plurality of financial documents over an extended period of time to detect a data input;
apply a machine learning model to the plurality of financial documents to determine one or more relevant financial documents of the plurality of financial documents that are associated with a potential tax implication, the machine learning model trained to identify potential tax implications using historic tax implication data from a tax implication database;
retrieve the one or more relevant financial documents from the financial account;
automatically determine an assistant-initiated trigger based upon the data input;
interface with the tax implication database via a communications element;
determine a probability that the assistant-initiated trigger is indicative of the potential tax implication by using the machine learning model to consult the tax implication database,
wherein the tax implication database comprises user-verified data such that the machine learning model is personalized to the user;
determine a data request based at least in part on the data input;
receive a response based upon the data request,
wherein the response is indicative as to whether the assistant-initiated trigger is indicative of an actual tax implication;
provide the one or more relevant financial documents from the financial account to a tax preparation system for a tax return preparation process; and
provide, upon determining the actual tax implication, information indicative of the data input and the response to an external repository associated with the tax preparation system and the tax implication database to improve an accuracy of the machine learning model.

10. The one or more non-transitory computer readable storage media of claim 9,
wherein the data input is received from an external device,
wherein the data request is presented to the user by an audible message via a speaker, and
wherein the response is received from the user by an audible input via a microphone.

11. The one or more non-transitory computer readable storage media of claim 9,
wherein the data input is received from the user by an audible input via a microphone,
wherein the data request is presented to an external device to verify the potential tax implication, and
wherein the response is presented to the user by an audible message via a speaker.

12. The one or more non-transitory computer readable storage media of claim 9,
wherein the data input is detected by analyzing a user account of the one or more user accounts associated with an external device,
wherein the data request is presented to the user by an audible message via a speaker, and
wherein the response provides a verification of the actual tax implication.

13. The one or more non-transitory computer readable storage media of claim 12,
wherein the external device is a first external device,
wherein a second communications element is communicably coupled to a second external device,
wherein the first external device is a smart phone associated with the user, and
wherein the second external device is a server configured to interface with at least one of a customer bank and an e-mail system.

14. The one or more non-transitory computer readable storage media of claim 9, wherein at least a portion of the one or more non-transitory computer readable storage media is associated with a home assistance device.

15. The one or more non-transitory computer readable storage media of claim 9, wherein at least a portion of the one or more non-transitory computer readable storage media is associated with a smart phone associated with the user.

16. An electronic tax assistant for assisting a user in preparing for a tax return preparation process, the electronic tax assistant comprising:
at least one processor; and one or more non-transitory computer readable storage media storing computer-executable instructions that, when executed by the at least one processor, perform a method comprising:
request credentials from the user to access one or more user accounts of the user, the one or more user accounts comprising at least an email account;
after receiving the credentials, automatically access the one or more user accounts using the credentials on behalf of the user to review a plurality of documents associated with the one or more user accounts, including one or more documents with a potential tax impact from the email account;
apply a machine learning model to the plurality of documents to determine one or more relevant documents of the plurality of documents that are associated with a potential tax implication, the machine learning model trained to identify potential tax implications using historic tax implication data from a tax implication database;
retrieve the one or more relevant documents from the one or more user accounts;
continuously monitor, as a background function of the electronic tax assistant, a data set associated with the one or more user accounts including the one or more relevant documents to detect a data input;
automatically determine an assistant-initiated trigger based upon the data input;
interface with the tax implication database via a communications element;
determine a probability that the assistant-initiated trigger is indicative of the potential tax implication by using the machine learning model to consult the tax implication database,
wherein the tax implication database comprises user-verified data such that the machine learning model is personalized to the user;
determine a data request based at least in part on the data input,
wherein at least one of the data input and the data request is associated with an external device;
receive a response based upon the data request,
wherein the response is indicative as to whether the assistant-initiated trigger is indicative of an actual tax implication;
provide the one or more relevant documents from the one or more user accounts to a tax preparation system for the tax return preparation process; and
provide, upon determining the actual tax implication, information indicative of the data input and the response to an external repository associated with the tax preparation system and the tax implication database to improve an accuracy of the machine learning model.

17. The electronic tax assistant of claim 16, wherein the electronic tax assistant is associated with a hardware platform selected from a group consisting of a smart phone and a home assistance device.

18. The electronic tax assistant of claim 16,
wherein the data input is received from the external device,
wherein the data request is presented to the user by an audible message via a speaker, and
wherein the response is received from the user by an audible input via a microphone.

19. The electronic tax assistant of claim 16,
wherein the data input is received from the user by an audible input via a microphone,
wherein the data request is presented to the external device to verify the potential tax implication, and
wherein the response is presented to the user by an audible message via a speaker.

20. The electronic tax assistant of claim 16,
wherein the data input is detected by analyzing the one or more user accounts of the user,
wherein the data request is presented to the user by an audible message via a speaker, and
wherein the response provides a verification of the actual tax implication.

* * * * *